(No Model.)

H. A. VEAZIE.
EVACUATING DEVICE FOR PNEUMATIC TIRES.

No. 564,666. Patented July 28, 1896.

Witnesses:

Inventor
H. A. Veazie
By James J Sheehy
Attorney

UNITED STATES PATENT OFFICE.

HENRY AUGUSTUS VEAZIE, OF NEW ORLEANS, LOUISIANA.

EVACUATING DEVICE FOR PNEUMATIC TIRES.

SPECIFICATION forming part of Letters Patent No. 564,666, dated July 28, 1896.

Application filed May 16, 1896. Serial No. 591,866. (No model.)

*To all whom it may concern:*

Be it known that I, HENRY AUGUSTUS VEAZIE, a citizen of the United States, residing at New Orleans, in the parish of Orleans and State of Louisiana, have invented certain new and useful Improvements in Evacuating Devices for Pneumatic Tires; and I do declare the following to be a full, clear, and exact description of the invention, such as will enable others skilled in the art to which it appertains to make and use the same.

In a prior application for Letters Patent, filed February 28, 1896, and Serial No. 581,097, I have disclosed a pneumatic tire comprising a plurality of inflatable compartments, an inflation-tube or tube for the connection of an inflating device, and a conduit connected with the inflation-tube and extending through the compartments and having its portions within the compartments collapsible and provided with apertures for effecting communication between the interior of the conduit and the interior of the compartments. In this construction the air is forced through the inflation-tube and the conduit and through the apertures in the collapsible portions of the conduit into the compartments to inflate the same, and when the pressure in the collapsible portions of the conduit is equal to that in the compartments the said collapsible portions will be retained in an expanded condition. When, however, the pressure in the conduit is removed, as by the puncture of a compartment or by removing the check or non-return valve from the inflation-tube, the pressure within the compartments acting against the outside of the collapsible portions of the conduit will collapse or press said portions together, and consequently the escape or evacuation of air from the compartments will be effectually prevented. It is often desirable to remove the compressed air from the compartments for various reasons; and to do this it is necessary to provide some means for opening the collapsible portions of the conduit, so as to permit the air to pass from the compartments through the apertures in the collapsible portions of the conduit into said conduit and through the conduit and open inflation-tube to the outer air.

My present invention has for its general object to provide a simple, efficient, and easily-handled device for the purpose; and with this end in view the invention will be fully understood from the following description and claims when taken in conjunction with the accompanying drawings, in which—

Figure 1:
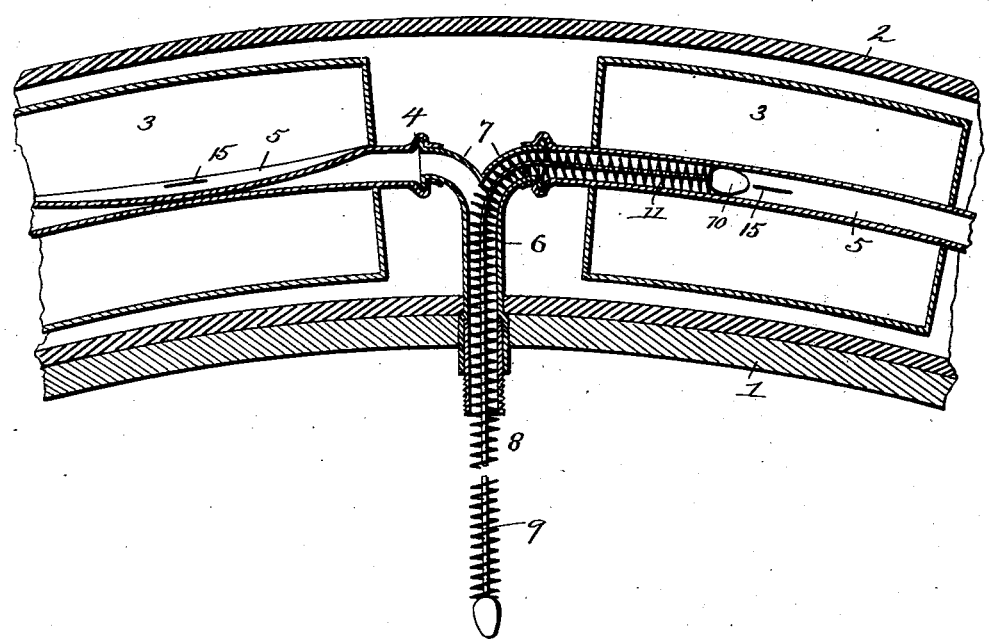
Figure 2:
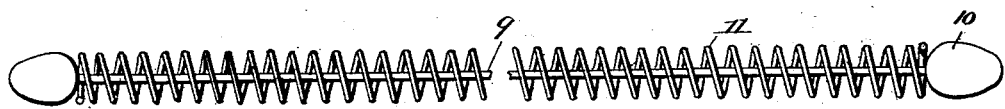
Figure 3:
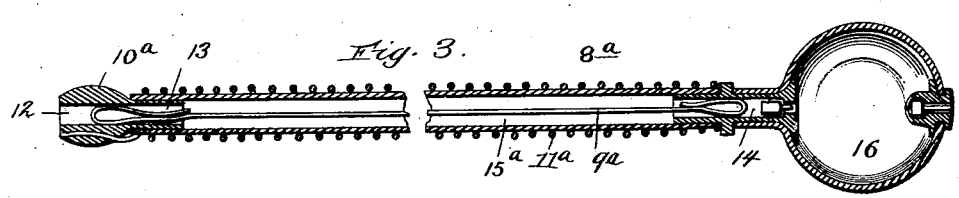

Figure 1 is a sectional view of so much of the before-mentioned tire as is necessary to illustrate the manner of using my improved device, said device being illustrated in an operative position. Fig. 2 is a broken view of the improved air evacuating or removing device removed from the tire, and Fig. 3 is a similar view of a modification.

Referring by numerals to the said drawings, 1 indicates the felly or rim of a wheel, 2 indicates a tire-cover, 3 indicates the inflatable compartments of the tire, and 4 indicates the conduit for conducting air into the compartments, which conduit comprises the collapsible portions 5, of thin rubber or the like, which have apertures 15, and unions (not illustrated) which connect the collapsible portions 5 and also the compartments 3 together. These parts are all described in detail in my aforesaid application, and they therefore need not be specifically described herein.

6 indicates an inflation-tube or a tube for the connection of an inflating device. This tube may or may not be valved, as desired, but if a valve is employed it should be made removable, so as to provide a free passage through the tube when the same is desired. At its inner end the tube 6 is provided with one or two (preferably two) curved arms 7, which are designed for the connection of the collapsible conduit portions 5 of the contiguous compartments 3, and are also designed to guide my improved device 8 into said portions 5.

The device 8 is preferably of such length as to enable it to extend through the conduit 4 entirely around a wheel, and it comprises a resilient rod 9, which is sufficiently stiff to permit of the device being pushed through the conduit 4; a head 10 at one or both (preferably both) ends of the rod 9, which is preferably tapered or provided with a blunt point, as illustrated, to facilitate the passage of the device through the conduit without injury to the conduit, and a wire 11, which is coiled about the rod 9, and is preferably connected at its ends to the heads 10, and is designed in practice to hold the collapsible portions 5 of the conduit distended or open, as shown in Fig. 1, so as to permit the air to pass from the compartments 3 through the apertures 15 in the conduit portions 5 and the conduit and the inflation-tube 6 to the outer air.

When it is desired to use my improved device, the valve is removed from the inflation-tube 6 in case said tube is valved, and the device 8 is then introduced through said tube 6, and is pushed entirely through the conduit 4, so as to distend all of the collapsible portions 5 thereof and permit the air to escape from the compartments 3 through the conduit 4 and the tube 6, as before described. In this way it will be observed that the air may be expeditiously removed from the compartments without injuring or impairing any of the parts of the tire.

When desirable, the device 8 need be made but about half as long as the length of the conduit 4, in which case it will be necessary to first introduce the device through one arm 7 of the tube 6 and then through the other arm thereof.

When not in use, the improved evacuating device may be coiled so as to take up but a minimum amount of space.

The heads 10 do not form absolutely essential parts of my improved device, but they are desirable adjuncts, inasmuch as they facilitate the passage of the device through the conduit and at the same time prevent damage of said conduit.

When desirable the coiled wire 11 need not extend the full length of the rod 9, described, in which case a portion of the rod may be used as a handle to facilitate the manipulation of the device.

When it is desired to simply use the device for distending collapsible inflation-tubes, the rod 9 may be made stiff, if desired.

The collapsed condition of the portions 5 of the conduit when the pressure is removed therefrom impedes the passage of the evacuating device and gives rise to considerable friction, which tends to injure said collapsible portion 5. To overcome these objections, I have provided the construction of device 8ª shown in Fig. 3. This device 8ª comprises a head 10ª, which has a central passage 12 and a nipple 13, a union 14, a rod 9ª, similar to the rod 9, (shown in Figs. 1 and 2,) which is connected to the head 10ª and union, as shown, the coiled wire 11ª, which surrounds the rod 9ª, and is preferably connected to the head 10ª and union 14, as shown, and the tube 15, of rubber or other suitable material, which surrounds the rod 9ª, and is arranged within the wire coil 11ª, and is connected at one end to the nipple 13 of the head 10ª and at its opposite end to one end of the union 14. The other end of the union 14 is connected in a detachable or other suitable manner to a bulb 16, of rubber, or to a pump or other device capable of forcing air through the tube 15. In virtue of this construction, it will be seen that when the device 8ª is inserted in the conduit 4 air may be forced through the tube 14 and the passage 12 of head 10ª into the conduit 4 in advance of the device 8ª. The head 10ª will prevent it from passing rearwardly, and consequently it will serve to expand or distend the collapsible portions 5 of the said conduit, and thereby permit of the evacuating device being easily pushed through the same to further expand or distend them and hold them in such condition. When this is done, the air will escape through the openings 15 of the conduit portions 5, and, passing between the wire coil and said portions 5 and between said wire coil and the inflation-tube, will reach the outer air. In this way it will be seen that all of the several compartments 3 of a tire may be quickly exhausted of compressed air.

Having described my invention, what I claim is—

1. As a new article of manufacture, the device described for removing or evacuating air from a pneumatic tire, comprising a rod and a wire coiled about the same, substantially as specified.

2. As a new article of manufacture, the device described for removing or evacuating air from a pneumatic tire, comprising a rod, a blunt head at one end of the rod, and a wire coiled about the rod, substantially as specified.

3. As a new article of manufacture, the device described for evacuating air from a pneumatic tire, comprising a resilient rod, a blunt head at one end of the rod, and a wire coiled about said rod, substantially as and for the purpose set forth.

4. As an improved article of manufacture the device described for removing or evacuating air from a pneumatic tire comprising a rod, a head at one end of the rod having a passage, a wire coiled about the rod and a tube arranged within the wire coil and receiving the rod and communicating with the passage in the head, the said tube being designed to be connected with an air-pumping device, substantially as specified.

5. As an improved article of manufacture the device described for removing or evacuating air from a pneumatic tire comprising a rod, a head at one end of the rod having a passage, a wire coiled about the rod and a tube arranged within the wire coil and receiving the rod and communicating with the passage in the head, and an air-pumping device connected to the opposite end of the said tube, substantially as specified.

In testimony whereof I affix my signature in presence of two witnesses.

HENRY AUGUSTUS VEAZIE.

Witnesses:
MAYBIN H. HART,
SAUL LICHTENTAG.